United States Patent
Liardet et al.

(10) Patent No.: US 7,827,413 B2
(45) Date of Patent: Nov. 2, 2010

(54) EXTRACTION OF A PRIVATE DATUM TO AUTHENTICATE AN INTEGRATED CIRCUIT

(75) Inventors: Pierre-Yvan Liardet, Peynier (FR); Luc Wuidart, Pourrieres (FR); François Guette, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 1485 days.

(21) Appl. No.: 10/473,903

(22) PCT Filed: Apr. 4, 2002

(86) PCT No.: PCT/FR02/01190

§ 371 (c)(1),
(2), (4) Date: Feb. 6, 2004

(87) PCT Pub. No.: WO02/082389

PCT Pub. Date: Oct. 17, 2002

(65) Prior Publication Data

US 2004/0114765 A1  Jun. 17, 2004

(30) Foreign Application Priority Data

Apr. 4, 2001  (FR) .................................. 01 04586

(51) Int. Cl.
  *G06F 21/00* (2006.01)
  *G06F 12/14* (2006.01)
  *G06F 21/02* (2006.01)

(52) U.S. Cl. .................. 713/189; 713/192; 713/193; 713/194; 713/182; 380/44; 380/262; 380/264; 380/265; 380/277; 726/16; 726/17; 726/21; 702/117

(58) Field of Classification Search .................. None
See application file for complete search history.

(56) References Cited

U.S. PATENT DOCUMENTS

| 5,818,738 | A | | 10/1998 | Effing | |
|---|---|---|---|---|---|
| 5,887,065 | A | * | 3/1999 | Audebert | 713/172 |
| 5,917,909 | A | | 6/1999 | Lamla | |
| 6,028,445 | A | * | 2/2000 | Lawman | 326/38 |
| 6,067,621 | A | * | 5/2000 | Yu et al. | 713/172 |
| 6,085,323 | A | * | 7/2000 | Shimizu et al. | 713/150 |
| 6,161,213 | A | | 12/2000 | Lofstrom | |

(Continued)

FOREIGN PATENT DOCUMENTS

DE  198 43 424 A  3/2000

(Continued)

OTHER PUBLICATIONS

International Search Report from the corresponding International Application No. PCT/FR02/01190.

(Continued)

*Primary Examiner*—Syed A. Zia
(74) *Attorney, Agent, or Firm*—Lisa K. Jorgenson; James H. Morris; Wolf, Greenfield & Sacks, P.C.

(57) ABSTRACT

A method and a circuit for extracting a secret datum from an integrated circuit taking part in an authentication procedure that uses an external device that takes this secret datum into account, the secret datum being generated on request and made ephemeral.

13 Claims, 3 Drawing Sheets

U.S. PATENT DOCUMENTS

| | | | |
|---|---|---|---|
| 6,192,436 B1 * | 2/2001 | Jacobson et al. | 710/104 |
| 6,223,984 B1 * | 5/2001 | Renner et al. | 235/380 |
| 6,233,339 B1 | 5/2001 | Kawano et al. | |
| 6,299,069 B1 * | 10/2001 | Shona | 235/492 |
| 6,351,813 B1 * | 2/2002 | Mooney et al. | 713/185 |
| 6,442,525 B1 | 8/2002 | Silverbrook et al. | |
| 6,654,889 B1 * | 11/2003 | Trimberger | 713/191 |
| 6,657,535 B1 | 12/2003 | Magbie et al. | |
| 6,691,921 B2 | 2/2004 | Endo et al. | |
| 6,769,062 B1 * | 7/2004 | Smeets et al. | 713/189 |
| 6,829,356 B1 * | 12/2004 | Ford | 380/44 |
| 6,829,367 B1 * | 12/2004 | Toyokawa et al. | 382/100 |
| 6,948,065 B2 * | 9/2005 | Grawrock | 713/168 |
| 7,005,733 B2 * | 2/2006 | Kommerling et al. | 257/679 |
| 7,017,043 B1 | 3/2006 | Potkonjak | |
| 7,334,131 B2 * | 2/2008 | Orlando et al. | 713/189 |
| 7,564,345 B2 * | 7/2009 | Devadas et al. | 340/539.1 |
| 7,681,103 B2 * | 3/2010 | Devadas et al. | 714/752 |
| 7,702,927 B2 * | 4/2010 | Devadas et al. | 713/194 |
| 2001/0037458 A1 * | 11/2001 | Kean | 713/193 |
| 2003/0046560 A1 * | 3/2003 | Inomata et al. | 713/189 |
| 2005/0160095 A1 * | 7/2005 | Dick et al. | 707/10 |
| 2009/0313473 A1 * | 12/2009 | Walker et al. | 713/175 |

FOREIGN PATENT DOCUMENTS

| | | |
|---|---|---|
| EP | 0 128 672 A1 | 12/1984 |
| EP | 1 86230 A2 | 7/1986 |
| FR | 2 796 175 A1 | 1/2001 |
| GB | 2 140 592 A | 11/1984 |

OTHER PUBLICATIONS

French Search Report from French Patent Application 01/07591, filed Jun. 11, 2001.

* cited by examiner

EXTRACTION OF A PRIVATE DATUM TO AUTHENTICATE AN INTEGRATED CIRCUIT

BACKGROUND OF THE INVENTION

1. Field of the Invention

The present invention relates to the authentication of an integrated circuit or of an electronic component or sub-assembly containing such a circuit by an authentication procedure using a secret datum contained in the integrated circuit. The present invention more specifically relates to authentication procedures based on the use of a private or secret datum or key by means of an external device. An example of application of the present invention is the field of smart cards, be they of prepaid count unit type or not.

2. Discussion of the Related Art

The various methods of authentication of a smart card or the like aim at avoiding the piracy or the falsification of a card, either by use of a discrete device reproducing the card or by piracy of a read terminal, or by large-scale reproduction of falsified smart cards.

The authentication methods with the highest performance use a private datum present in the integrated circuit to be authenticated and a so-called public datum or key, depending on this private datum and stored in an external device. The private datum is indirectly involved each time the integrated circuit requires authentication, without any "knowledge transfer". In so-called "zero-knowledge" methods, the authentication occurs according to a protocol which, in a proved manner and under hypotheses recognized as being perfectly reasonable by the scientific community, reveals nothing of the secret key of the entity, the signature of which must be authenticated. Examples of known authentication methods to which the present invention applies are described in French patent application No. 2716058 and in U.S. Pat. No. 4,995,082 which are incorporated herein by reference.

The disadvantage of using a private datum, which is anyhow indispensable to make out or differentiate electronic assemblies or sub-assemblies, for example, smart cards, from one another, is that this datum is a datum stored in the component to be identified. Such a datum is for example capable of being pirated by examination of the storage element of this datum in the smart card, or by pirating of the registers in which the datum is stored, etc. The private datum furthermore generally is immutable for a given smart card, to enable repeated authentication thereof. This results in a fragility of the authentication function.

In an application to prepaid smart cards (for example, telephone unit cards), if the private datum is the same for an entire smart card family, this allows for large-scale piracies.

In practice, it is not the actual private datum which is sent, but rather a calculation result taking account of this private datum, a number which is a function of a random number chosen by the integrated circuit and communicated to the external circuit, and a random number chosen by the external device and communicated to the card. The result is then checked by the external device to authenticate the card.

The present invention aims at improving integrated circuit authentication procedures and systems using a private datum coming from the integrated circuit.

The present invention more specifically aims at improving or optimizing the anti-fraud security of electronic devices using an integrated circuit provided with a private datum by preventing the extraction of this private datum by various attacks against the integrated circuit.

To achieve these and other objects, the present invention provides a method for extracting a private datum from an integrated circuit taking part in an authentication procedure by means of an external device taking this private datum into account, the private datum being generated on request and made ephemeral.

According to an embodiment of the present invention, upon each generation of the private datum, a lifetime of this private datum is initialized and this datum is deleted from at least one first storage element containing it, at the end of this lifetime.

According to an embodiment of the present invention, the generation of the private datum and the initialization of its lifetime are started by a same signal.

According to an embodiment of the present invention, the lifetime of the private datum is reduced along its generations.

According to an embodiment of the present invention, the lifetime is variable.

According to an embodiment of the present invention, the private datum is obtained at least partially from a physical parameter network.

According to an embodiment of the present invention, the physical parameter network is programmable.

According to an embodiment of the present invention, the physical parameter network is programmed, at least partially, by a word provided by a storage element.

According to an embodiment of the present invention, the physical parameter network is programmed, at least partially, by noise.

According to an embodiment of the present invention, the physical parameter network is also controlled outside periods of generation of the private datum.

According to an embodiment of the present invention, the private datum is obtained at least from a first datum stored in the integrated circuit and from a second datum generated on request by the physical parameter network.

According to an embodiment of the present invention, the second datum is made ephemeral.

According to an embodiment of the present invention, the number of bits of the first and second data are close to each other, and preferably equal.

The present invention also provides an integrated circuit, including means for implementing the method.

According to an embodiment of the present invention, the circuit includes a is circuit for resetting at least one storage element.

According to an embodiment of the present invention, the reset circuit is formed of one or several delay elements initialized by a control signal of generation of the private datum.

According to an embodiment of the present invention, the delay introduced by at least one delay element of the reset circuit is variable.

The foregoing objects, features and advantages of the present invention, will be discussed in detail in the following non-limiting description of specific embodiments in connection with the accompanying drawings, in which:

DETAILED DESCRIPTION

The same elements have been designated with same references in the different drawings. For clarity, only those method steps and those elements of the extraction circuit that are necessary to the understanding of the present invention have been shown in the drawings and will be described hereafter. In particular, the authentication methods and the algorithms using private data are well known and will not be detailed, except as concerns the provision of the private datum which is the object of the present invention.

A feature of the present invention is that it does not permanently store the private or secret datum in binary form in the integrated circuit, but generates this private datum on request, that is, for an authentication procedure. The present invention further provides for this private datum to be ephemeral, that is, no longer detectable in the integrated circuit after a predetermined time following its generation.

Figure 1:
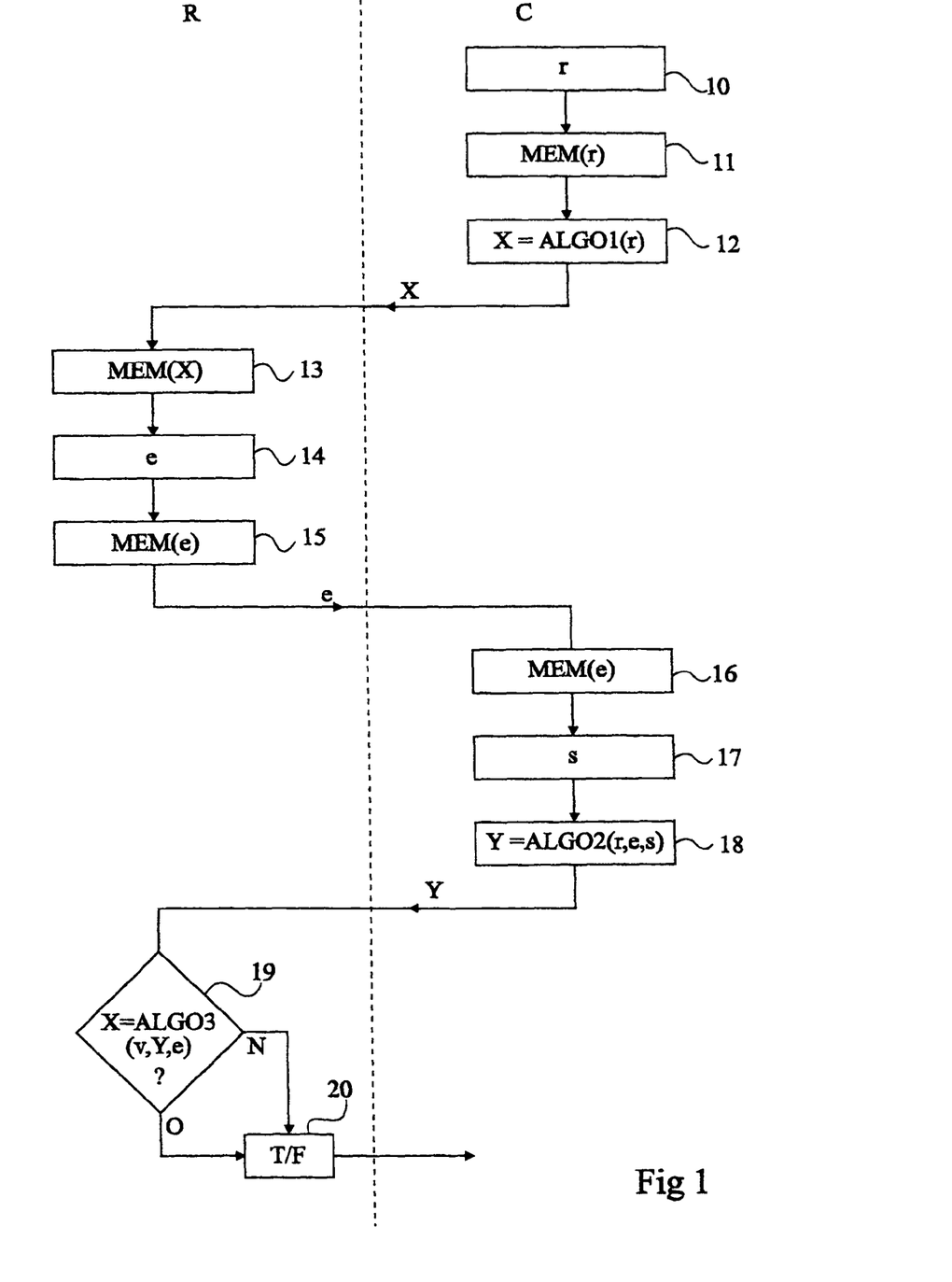
FIG. 1 illustrates, in the form of a flowchart, a method of authentication of an integrated circuit using a private datum to which the present invention applies.

FIG. 1 shows, in the form of a simplified flowchart, a mode of implementation of an authentication procedure of the type to which the present invention applies. This example concerns the authentication of a smart card by an external device. In FIG. 1, the steps of the authentication procedure taking place on the side of card C or on the side of reader R are shown.

An authentication phase of course follows the introduction of a card into the reader, the sending of an identifier by the card to the reader or to a central station, its checking by the central station, then the extraction by the central station of a public datum or key v based on the identifier communicated by the card. This public key most often comes from a key table.

For the actual authentication phase, a number r is first randomly drawn (block 10), on the card side. Number r is stored (block 11, MEM(r)) in the card integrated circuit. Then, a first algorithm ALGO1 providing a result X is applied (block 12) to this number r. Result X is transmitted to reader R, which stores it (block 13, MEM(X)). On the reader side, a random number e is drawn (block 14) and stored (block 15, MEM(e)). Number e is sent to card C, which itself stores it (block 16, MEM(e)).

The card then extracts its private datum s (block 17) according to the method of the present invention. Private datum s is taken into account in a second algorithm ALGO2 (block 18) with data r and e to provide a result Y. Preferably, number r is deleted after having been used to calculate number Y and before the sending of the latter. Result Y is sent to reader R, which checks (block 19) by means of a third algorithm ALGO3 that variable X is equal to the application of this algorithm to variables Y, e, and v. Public key v of course is a function of private datum or key s of the card. According to the result of the coherence test, the reader provides an indicator of an authentication (T) or of no authentication (F) to the card (block 20). The authentication procedure is then over.

An authentication method such as described in FIG. 1 is known. The present invention only intervenes to provide private datum s in a specific manner.

The sizes of the different data are generally significant to improve the security against piracy.

According to a specific example of embodiment, the different variables are linked together by the following algorithms and relations:

public key v and private key s are linked by relation $v=g-s$ modulo n, where g represents a cyclic group generator and n an integer;

first algorithm ALGO1 is $X=g^r$ modulo n;

second algorithm ALGO2 is $Y=r+e.s$; and third algorithm ALGO3 is $X=g^Y.v^e$ modulo n.

Still according to this example, the different data taken into account may have the following sizes:

n, g, and X each represent approximately 1,000 bits;

r, s, and Y each represent approximately 220 bits; and e represents approximately 30 bits.

It should be noted that various algorithms are known in the art and may be implemented while using the method of the present invention. For example, public key v may be calculated by the reader or the central station based on the card identifier and on a datum transmitted by said card.

Figure 2:
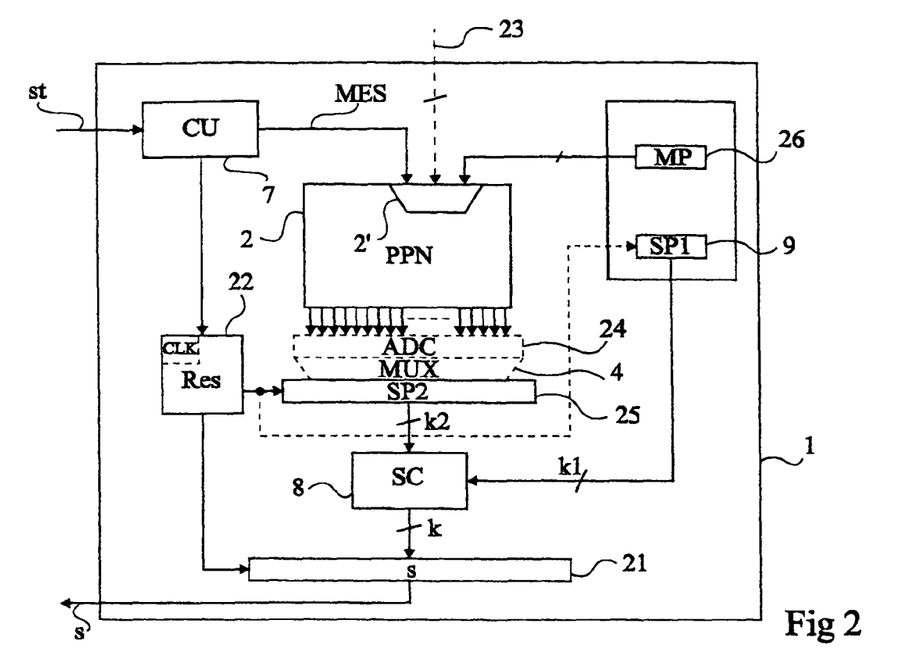
FIG. 2 very schematically shows, in the form of block diagrams, a circuit for extracting a private datum according to an embodiment of the present invention.

FIG. 2 shows an embodiment of a cell 1 for extracting a private datum from an integrated circuit according to the present invention. Cell 1 includes a physical parameter network (PPN) linked to the integrated circuit chip manufacturing. This physical parameter network 2 provides a large number of signals and takes part in the generation of private datum s according to the present invention.

Figure 3:
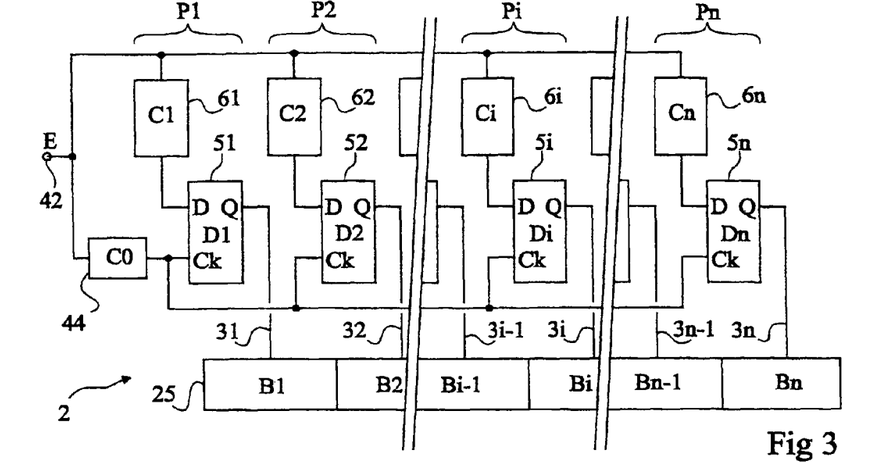
FIG. 3 shows an embodiment of a physical parameter network of an extraction circuit according to the present invention.

A preferred embodiment of a physical parameter network will be illustrated hereafter in relation with FIG. 3. However, a conventional physical parameter network including, for example, measuring electronic parameters may also be used. This may be, for example, a measurement of a threshold voltage of a transistor, a measurement of a resistance or a measurement of a stray capacitance, a measurement of the current generated by a current source, a measurement of a time constant (for example, an RC circuit), a measurement of an oscillation frequency, etc. Since these features are sensitive to technological and manufacturing process dispersions, it can be considered that the electric parameters taken into account are specific to a manufacturing and form a signature of the integrated circuits resulting from this manufacturing.

In the example of a measurement of electrical parameters, these signals are converted into digital signals by an analog-to-digital converter 24 (ADC) and may be multiplexed by a multiplexer 4 (MUX) to form a binary word SP2, stored in a register 25. Word SP2 is thus sensitive to technological and manufacturing process dispersions. Converter 24 and multiplexer 4 have been shown in dotted lines since they are optional. In particular, converter 24 may be omitted in the preferred embodiment of the physical parameter network described subsequently in relation with FIG. 3.

Preferably, the electrical parameters measured by network 2 are not always the same. Network 2 then is programmable. It is parameterized and configured upon each measurement based on a binary word MP, stored in a register 26. Word MP is specific to the integrated circuit chip and may be individualized from one card to another. The measurement of the physical parameters is started by a signal MES coming from a control unit 7 of cell 1.

Cell 1 preferably receives a single control signal St, which triggers an extraction of parameter s provided on a single output terminal of cell 1.

Word SP2 is provided to a combiner 8 also receiving a binary word SP1 stored in a register 9. The function of circuit 8 is to combine words SP1 and SP2 to provide the private datum s stored in a register 10.

As a specific example of implementation, the combination performed by combiner 8 may be of the following type:

$$s=((SP1-SP2)^2+(SP1+SP2)^2)^2 \text{ modulo } P,$$

where P is a prime number over k bits. Number s then is a k-bit word obtained from words SP1 and SP2 respectively over k1 and k2 bits. Preferably, bit numbers k1 and k2 of words SP1 and SP2 are equal. This enables maintaining the same difficulty for a possible pirate in the case where a portion (SP1 or SP2) of word s should be discovered.

Like number MP, number SP1 is different from one card to another. Combiner 8 guarantees the size of datum s and a non-zero value. The use of a datum SP1 specific to the card guarantees that private key s is unique, whatever datum MP provided to the physical parameter network for configuration. According to a simplified embodiment, for example, for a circuit of reduced size, it may be sought, for a given private key size, to limit the size of the physical parameter network by increasing the size of datum SP1.

According to the present invention, cell 1 also includes a circuit 22 for resetting (to zero or one) some of its registers. Circuit 22 especially has the function of making the presence of datum s in register 21 temporary. To guarantee optimal security, circuit 22 (Res) controls the resetting, not only of register 21 but also of register 25 containing datum SP2 extracted from network 2. In other words, the lifetime of the private datum and/or of its components is determined from its generation.

An advantage of the present invention is that by combining the use of an physical parameter network to condition at least part of the private datum and the use of a temporized reset of the storage elements (for example, registers) storing this private datum, it prevents a possible pirate from discovering the private datum of the card, for example, by a visual examination.

The combinations of parameters MP and SP1 conditioning the obtaining of the private datum increase the difficulty of piracy. It should however be noted that the use of a combination of words SP1 and SP2 is optional. In a first version, the private datum may merely be generated from the physical parameter network and be made ephemeral by circuit 22. According to another simplified embodiment, data MP and SP1 are confounded. In this case, a single register 9 or 26 is used. The coherence of the response of the physical parameter network may also be detected since data SP1 and SP2 are correlated. This can enable, for example, detecting a copy made after piracy of datum SP1 and reproduction of network 2, if the technological or manufacturing process dispersions are different for the original circuit and the pirate circuit.

Circuit 22 is for example controlled by a clock CLK started by control unit 7 upon arrival of a signal St for starting the extraction of parameter s.

According to an embodiment of the present invention applied to the case where a code is input by the card user, this code can be directly stored or modified in register 9 to form code SP1. In this case, circuit 22 may also reset register 9 to 0 to prevent the permanent presence of code SP1 on the card. This function is illustrated by dotted lines in FIG. 2.

According to another alternative, a noise source (dotted lines 23) may be added to the network control. Random control signals can thus be provided to the physical parameter network outside of authentication periods. This makes the piracy by observation of the circuit power consumption even more difficult. By permanently operating network 2, it will be more difficult for a pirate to spot at which moment it is used to generate a key. Further, a pirate may consider network 2 as a mere analog noise source used to scramble the power consumption, which is known per se, and afterwards eliminate the contribution to the power consumption in its attack, including at the time when the network is used to generate a key. The measurement signal then controls a multiplexer intended to select or combine the configuration signals represented by word MP and the bits M23 arriving on link 23. Signal MES is, for example, a bit for triggering a multiplexer 2' of signals MP and M23. Noise source 23 can replace all or part of word MP in the parameterizing or the programming of network 2.

According to another alternative, word MP is permanently provided to network 2 which then spends all its time generating datum SP2. Private key s however remains ephemerally generated upon combination with datum SP1. There are then more chances still for the pirate to filter the power consumption response of network 2 upon an attack including examining the circuit power consumption.

The forming of a physical parameter network including measuring electric parameters present in the network in the form of resistances, stray capacitances, or the like, is not described in detail. Such a forming is conventional. It may be, for example, a network of resistances and/or of switchable capacitors connected in parallel and/or in series, the switches being controlled according to configuration signals MP and possibly M23 arriving on network 2.

Circuits using a time measurement may also be used as networks of physical parameters. For example, the read/write time of an EEPROM-type memory is measured. An example of an physical parameter network of this type is described in U.S. Pat. No. 5,818,738 which is incorporated herein by reference.

FIG. 3 shows the electric diagram of a preferred embodiment of an physical parameter network according to the present invention.

In this example, circuit 2 includes a single input terminal 42 intended for receiving a digital signal E for triggering a generation. To implement the present invention, signal E must include, as will be seen hereafter in relation with FIGS. 4A and 4B, at least one edge per identification. It may directly be signal St.

Circuit 2 directly provides a binary code $B_1, B_2, \ldots, B_{i-1}, B_i, \ldots, B_{n-1}, B_n$ over a predetermined number of bits, this code being sensitive to technological and circuit manufacturing process dispersions. Each bit Bi is provided on a terminal $3_1, 3_2, \ldots, 3_{i-1}, 3_i, \ldots, 3_{n-1}, 3_n$ of circuit 2 which is specific to it. Circuit 2 thus provides the identification code in parallel form.

To each identification bit Bi is associated an electric path $P_1, P_2, \ldots, P_i, \ldots, P_n$ connecting the common input terminal 42 to a terminal $3_i$ of same rank. Preferably, the delay introduced by the different electric paths $P_i$ are chosen to be slightly different from one another to guarantee a sensitivity to the technological dispersions of the manufacturing process.

It can thus be seen that, by the different delays introduced by the electric paths, the edge triggering input signal E is reproduced on the different outputs at different times.

It is provided to read the information present at the outputs of circuit 2 in a synchronized way and at a time approximately corresponding to the theoretical average delay between the different electric paths. More specifically, according to the preferred embodiment of the present invention illustrated in FIG. 3, an average electric path 44 (C0) is provided to set the read time after occurrence of the edge triggering input signal E.

For example, path 44 connects input 42 of circuit 2 to the terminals Ck of flip-flop $5_1, 5_2, \ldots, 5_i, \ldots 5_n$ belonging to the respective electric paths $P_1, P_2, \ldots, P_i, \ldots, P_n$ and the respective Q outputs of which form output terminals $3_1, 3_2, \ldots 3_i, \ldots, 3_n$ of circuit 2. According to this embodiment, each electric path $P_i$ includes a delay element $6_1$ (C1), $6_2$ (C2) ..., $6_i$ (Ci) ..., $6_n$ (Cn) connecting input 42 of the circuit to the D input of the corresponding flip-flop in the path. Delay elements $6_i$ are the elements exhibiting, according to the present invention, different delays with respect to one another. Indeed, flip-flops $5_i$ all preferably have the same structure. They however take part in the delay brought to the input signal until it reaches the respective output terminals of circuit 2 with respect to the average delay C0 introduced by element 44.

When an edge is applied on input signal E, this edge reaches the respective D inputs of the flip-flops at different times. The reading of the input state of the different flip-flops is synchronized by the edge of signal E delayed, this time, by element 44. For this reason, in particular, a delay C0 approximately corresponding to the average delay of the different elements $6i$ is chosen.

In the example of FIG. 3, the different outputs $3_i$ of circuit 2 are individually connected at the input of a register for storing the obtained binary code, each bit $B_i$ corresponding to one of the circuit outputs. In practice, this register is register 25 of FIG. 2.

Figure 4A:
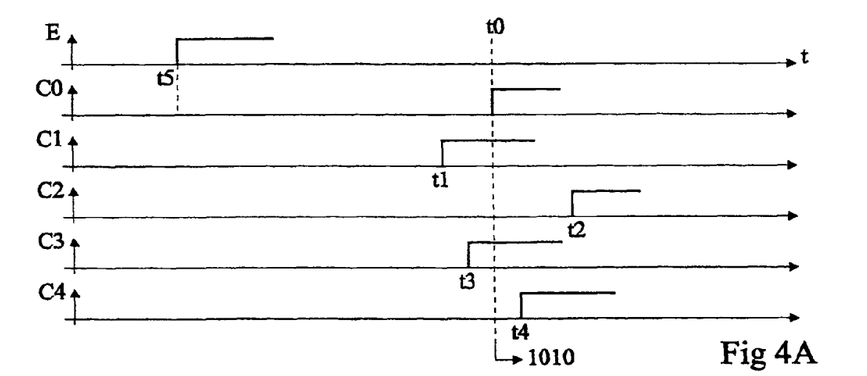
FIGS. 4A and 4B illustrate, in the form of timing diagrams, the operation of the network of FIG. 3.
Figure 4B:
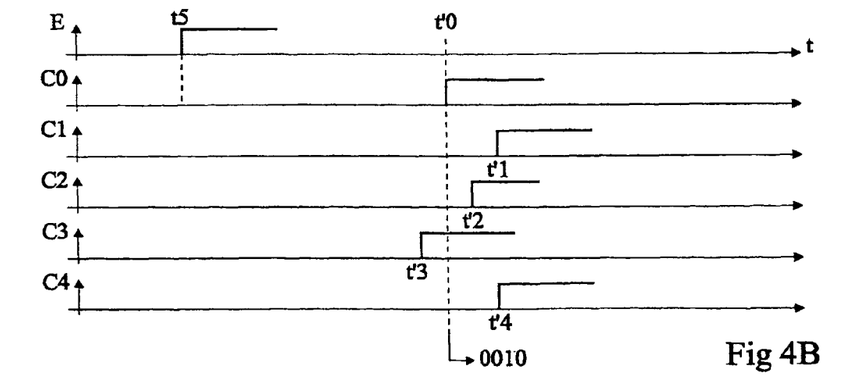

FIGS. 4A and 4B illustrate, in the form of timing diagrams and without any scale consideration, the operation of network 2 of FIG. 3. FIGS. 4A and 4B show examples of shapes of signal E, and output signals of the different delay elements. In the example of FIGS. 4A and 4B, the case of a binary code over four bits is considered for simplification. The timing diagrams have been designated with references C0, C1, C2, C3, and C4.

The difference between FIGS. 4A and 4B represents the difference between two circuits 1 integrated on chips coming from different manufacturing processes.

In FIG. 4A, it is assumed that at a time t5, a rising edge is triggered on signal E. This edge appears on the different inputs of the D flip-flops (corresponding to the outputs of delay elements C1, C2, C3, and C4) at different respective times t1, t2, t3, and t4. Further, element 44 (C0) introduces a delay starting the data reading at the flip-flop input at a time t0. All paths generating a delay greater than delay C0 provide a bit at state 0 since the edge of signal E has not reached them yet. All paths generating a delay shorter than delay C0 generate a bit at state 1 since the edge of signal E arrives on the input of the corresponding flip-flop before delay C0 has expired. In the example of FIG. 4A, at time t0, code 1010 is provided as an identification code.

FIG. 4B illustrates the same circuit coming from a different manufacturing process, thus providing a different chip. The code obtained therein is different. For example, it is code 0010. In FIG. 4B, a time t5 identical to the case of FIG. 4A has arbitrarily been shown. However, times t'0, t'1, t'2, t'3 and t'4 at which the edge of signal E is at the end of its way through respective paths C0, C1, C2, C3, and C4 are different from the case of FIG. 4A.

It should be noted that delay element C0 is itself sensitive to technological and manufacturing process dispersions. This has however no incidence for the implementation of the present invention since this delay represents an average delay and the searched code is arbitrary. Indeed, to generate a private key, what matters is that integrated circuits from a same manufacturing process generate the same code. Since the delay elements are sensitive to manufacturing process dispersions, such will be the case with the implementation of the preferred embodiment of network 2 of physical parameters.

An advantage of this embodiment is that network 2 is particularly sensitive. In practice, the detectable difference of the delays introduced by the different paths is on the order of one picosecond. Now, manufacturing process or technological dispersions most often introduce differences on the order of at least some ten picoseconds.

Another advantage is that in case of a drift in time of one of the delays introduced by the elements, this does not affect the circuit results. Indeed, all delay elements being preferably of similar structure, the dispersion will be in the same direction for all elements (paths).

To form the delay elements of the electric paths of the network of FIG. 3, any integrated element sensitive to technological dispersions or influenced by the manufacturing process may be used. This may be, for example, a series of resistors and/or capacitors. For the resistors, resistors across the integrated circuit thickness may be used, but polysilicon resistors, the value of which is linked to their geometry and which have the advantage of being less temperature-dependent will preferably be used. Of course, the delay elements may take other forms, provided that they are sensitive to technological and/or manufacturing process dispersions. Further, the choice of the variation range of the delays introduced by the different elements depends on the application and on the desired sensitivity.

An advantage of the physical parameter network illustrated in FIG. 3 is that it avoids use of an analog-to-digital converter 24 since the binary word is directly provided by the respective flip-flop outputs.

Figure 5:
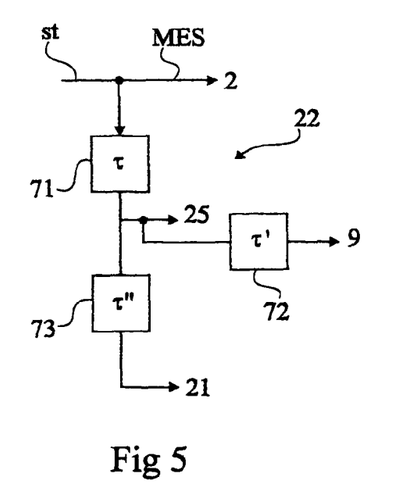
FIGS. 5, 6, and 7 show three embodiments of a circuit for resetting an extraction circuit according to the present invention.
Figure 6:
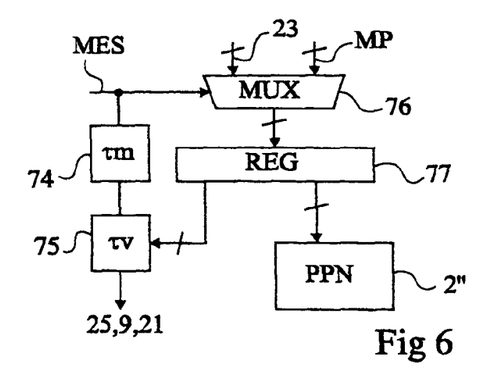
Figure 7:
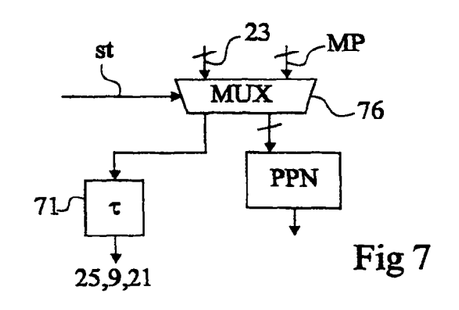

FIGS. 5 to 7 schematically and partially show different embodiments of reset circuit 22.

According to a first embodiment illustrated in FIG. 5, circuit 22 is formed of several delay elements 71 ($\tau$), 72 ($\tau'$), 73 ($\tau''$) to differentiate the reset times of registers 25, 9, and 21. In the example of FIG. 5, element 71 introduces delay $\tau$ for resetting register 25. Element 72 and element 71 with which it is in series introduce delay $\tau+\tau'$ for resetting register 9. Element 73 and element 71 with which it is in series introduce delay $\tau+\tau''$ for resetting register 21. It can be seen that, in a simplified manner, the signal applied to delay element 71 forming the first element of circuit 22 may directly be the bit of signal St which may also be control bit MES of the physical parameter network. In this case, it is enough for the reset inputs of the different registers to be activable the appropriate state of bit St.

According to the second embodiment of FIG. 6, signal MES is used to trigger a delay element 74 providing a minimum delay $\tau m$. Then, a variable delay $\tau v$ provided by an element 75 configurable according to signal MP and, if present, noise 23, are added to this minimum delay. FIG. 6 also illustrates an example of control of the physical parameter network more detailed than in FIG. 2. It shows a multiplexer 76 for combining signals MP and noise 23 or for selecting signal MP or noise 23. The reading of this multiplexer is controlled by signal MES. The multiplexer output provides a configuration word in a register 77 (REG). This configuration word is used by the actual physical parameter network 2'' and, according to this embodiment, to configure variable delay $\tau v$.

According to a third embodiment illustrated in FIG. 7, a fixed delay $\tau$, provided by an element 71, is used. However, instead of being triggered by the occurrence of signal St, delay $\tau$ is triggered by the implementation of the physical parameter network, that is, by multiplexer 76 or by register 77 (not shown in FIG. 7), or by a signal generated by the network itself. In the example of FIG. 7, delay element 71 may of course be associated with elements 72 and 73 of FIG. 5. More generally, the different examples of implementation as well as others may be provided individually or combined.

Of course, the present invention is likely to have various alterations, modifications, and improvement which will readily occur to those skilled in the art. In particular, although the present invention has been described in relation with a specific authentication process, it applies whatever the envisaged authentication procedure, provided that it uses a private datum for the circuit to be identified.

Further, reference has been made to storage registers which may be replaced with any adapted storage element, for example, memories or memory portions, volatile or not according to the type of stored data. Moreover, the writing and the reading of the data in the storage elements may be performed in series or in parallel.

Finally, it may be provided to reduce the time of the presence of the private key along its generations in a same authentication, for example, upon successive generations required by infructuous authentications. This further improves the reliability by reducing the presence of the private key for the case of an attack aiming at detecting this key.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not as limiting. The invention is limited only as defined in the following claims and the equivalents thereto.

What is claimed is:

1. A method for extracting a private datum from an integrated circuit taking part in an authentication procedure performed by an external device using the private datum, comprising steps of:
    generating the private datum on request, using at least one electrical parameter obtained from a physical parameter network; and
    making the private datum ephemeral, wherein upon each generation of the private datum, a lifetime of the private datum is initialized and the private datum is deleted from at least one first storage element containing the private datum, at the end of the lifetime, and wherein the physical parameter network is programmed, at least partially, by a binary word provided by a storage element and specific to the integrated circuit, wherein the physical parameter network comprises a plurality of electrical paths and the private datum comprises a plurality of bits, wherein each electrical path from the plurality of electrical paths provides a respective bit from the plurality of bits, wherein at least one electrical path from the plurality of electrical paths includes a delay element, and wherein the delay element provides a delay different from a delay provided by at least one another electrical path from the plurality of electrical paths.

2. The method of claim 1, wherein the private datum generation is independent of any datum external to the integrated circuit.

3. The method of claim 1, wherein the generation of the private datum and the initialization of the lifetime are started by a same signal.

4. The method of claim 1, wherein the lifetime of the private datum is variable.

5. A method for extracting a private datum from an integrated circuit taking part in an authentication procedure by means of an external device taking the private datum into account, comprising the steps of generating the private datum on request and making it ephemeral;
    wherein the private datum is obtained at least partially from using at least one electrical parameter measured from a physical parameter network;
    wherein the physical parameter network is programmable;
    wherein the physical parameter network is programmed, at least partially, by a binary word provided by a storage element and specific to the integrated circuit; and
    wherein the physical parameter network comprises a plurality of electrical paths and the private datum comprises a plurality of bits, and wherein each electrical path from the plurality of electrical paths provides a respective bit from the plurality of bits;
    wherein the private datum is obtained at least from:
        a first datum stored in the integrated circuit, and
        a second datum generated on request by the physical parameter network; and
    wherein the second datum is made ephemeral.

6. The method of claim 5, wherein the physical parameter network is programmed, at least partially, by noise.

7. The method of claim 5, including controlling the physical parameter network also outside periods of generation of the private datum.

8. The method of claim 5, wherein the number of bits of the first and second data are equal.

9. An integrated circuit, including:
    means for generating, using at least one electrical parameter obtained from a physical parameter network, a private datum to be provided outside of the circuit to be used in an authentication procedure of the circuit;
    a storing register for temporary storing said private datum;
    a reset circuit for re-initialization of said storing register at the end of a lifetime of the private datum so as to render said private datum ephemeral, wherein the lifetime is initialized upon generation of the private datum; and
    means for triggering the generation of said private datum upon a signal external to the integrated circuit,
    wherein the physical parameter network comprises a plurality of electrical paths and the private datum comprises a plurality of bits, wherein each electrical path from the plurality of electrical paths provides a respective bit from the plurality of bits, and
    wherein the private datum is obtained from a combination of at least:
        a first datum stored in the integrated circuit, and
        a second datum generated on request by the physical parameter network.

10. The integrated circuit of claim 9, comprising means for implementing the method of claim 1.

11. The circuit of claim 9, including means for generating the private datum, means for storing the first datum and means for storing the second datum.

12. The circuit of claim 11, wherein the reset circuit is formed of one or several delay elements initialized by a control signal of generation of the private datum.

13. The circuit of claim 12, wherein the delay introduced by at least one delay element of the reset circuit is variable.

* * * * *

UNITED STATES PATENT AND TRADEMARK OFFICE
CERTIFICATE OF CORRECTION

PATENT NO. : 7,827,413 B2
APPLICATION NO. : 10/473903
DATED : November 2, 2010
INVENTOR(S) : Pierre-Yvan Liardet et al.

It is certified that error appears in the above-identified patent and that said Letters Patent is hereby corrected as shown below:

Col. 6, line 67 should read:
terminals Ck of flip-flops $5_1$, $5_2$, ... , $5_i$, ... $5_n$ belonging to the Signed and Sealed this Fourteenth Day of December, 2010

David J. Kappos
*Director of the United States Patent and Trademark Office*